(12) United States Patent
Paderni et al.

(10) Patent No.: US 9,677,548 B2
(45) Date of Patent: Jun. 13, 2017

(54) PUMP

(71) Applicant: LEUCO S.P.A., Reggio Emilia (RE) (IT)

(72) Inventors: Gianni Paderni, Reggio Emilia (IT); Fabio Pedroni, Casalgrande (IT)

(73) Assignee: LEUCO S.P.A., Reggio Emilia (IT)

( * ) Notice: Subject to any disclaimer, the term of this patent is extended or adjusted under 35 U.S.C. 154(b) by 284 days.

(21) Appl. No.: 14/496,400

(22) Filed: Sep. 25, 2014

(65) Prior Publication Data
US 2015/0093264 A1 Apr. 2, 2015

(30) Foreign Application Priority Data
Sep. 30, 2013 (IT) .............. MO2013A0271

(51) Int. Cl.
| | |
|---|---|
| *F04B 53/02* | (2006.01) |
| *F04B 1/04* | (2006.01) |
| *F16J 15/324* | (2016.01) |
| *F16J 15/00* | (2006.01) |
| *F04B 53/14* | (2006.01) |
| *F04B 39/04* | (2006.01) |
| *F04B 1/00* | (2006.01) |

(52) U.S. Cl.
CPC ............ *F04B 1/0448* (2013.01); *F04B 1/005* (2013.01); *F04B 1/0439* (2013.01); *F04B 39/042* (2013.01); *F04B 53/02* (2013.01); *F04B 53/143* (2013.01); *F16J 15/002* (2013.01); *F16J 15/324* (2013.01)

(58) Field of Classification Search
CPC ...... F04B 1/005; F04B 1/0439; F04B 1/0448; F04B 39/041; F04B 39/042; F04B 53/02; F04B 53/143; F16J 15/002; F16J 15/006; F16J 15/182; F16J 15/188; F16J 15/189; F16J 15/3204; F16J 15/324; F16J 15/3268
USPC ........ 417/366, 415, 437, 568; 277/510, 511, 277/520, 609, 611; 92/165 R, 168
See application file for complete search history.

(56) References Cited

U.S. PATENT DOCUMENTS

| | | |
|---|---|---|
| 3,760,694 A | 9/1973 | Lieb |
| 4,875,690 A | 10/1989 | Tojo |
| D613,765 S | 4/2010 | Reverberi et al. |

(Continued)

FOREIGN PATENT DOCUMENTS

| | | |
|---|---|---|
| CN | 2416245 Y | 1/2001 |
| CN | 201666235 U | * 12/2010 |

(Continued)

*Primary Examiner* — Theodore Stigell
*Assistant Examiner* — Chirag Jariwala
(74) *Attorney, Agent, or Firm* — Pearne & Gordon LLP (57) ABSTRACT

A pump comprises at least one piston slidable within an opening along a movement direction in order to vary the volume of a chamber. The pump further comprises a casing within which a driving device is housed for moving the piston, and a head within which the chamber is at least partially obtained, the chamber being partially delimited by the piston. A high pressure sealing element is located in a proximal position with respect to the chamber and a low pressure sealing element is located in a distal position with respect to the chamber to stop any quantities of liquid that the high pressure sealing element has let through. The high pressure sealing element is housed inside the head and the low pressure sealing element is housed inside the casing.

11 Claims, 5 Drawing Sheets

(56) References Cited

U.S. PATENT DOCUMENTS

| | | |
|---|---|---|
| D633,105 S | 2/2011 | Magri |
| D633,406 S | 3/2011 | Magri |
| D670,312 S | 11/2012 | Alexander et al. |
| 8,408,886 B2 | 4/2013 | Fabbri |
| D688,273 S | 8/2013 | Magri |
| D692,026 S | 10/2013 | Alexander et al. |
| D699,762 S | 2/2014 | Alexander et al. |
| D700,211 S | 2/2014 | Alexander et al. |
| D702,262 S | 4/2014 | Magri |
| D726,225 S | 4/2015 | Alexander et al. |
| D726,226 S | 4/2015 | Alexander et al. |
| 2004/0161353 A1 | 8/2004 | Fabbri |
| 2011/0027106 A1 | 2/2011 | Ochiai |

FOREIGN PATENT DOCUMENTS

| | | | |
|---|---|---|---|
| CN | 201865875 U | | 6/2011 |
| CN | 201908798 U | | 7/2011 |
| CN | 201953640 U | * | 8/2011 |
| EP | 1450045 A1 | | 8/2004 |
| JP | 2011017376 A | * | 1/2011 |

* cited by examiner

PUMP

The present invention relates to a pump. In particular, the invention relates to a piston pump suitable for processing a liquid, particularly water. The piston pump according to the invention can be used inside cleaning machines such as small high pressure water jet machines.

Piston pumps are known comprising a plurality of pistons which are movable inside respective cylinders to increase or decrease the volume of corresponding chambers, so as to cause the suction of water into each chamber, or the exit of the water from the chamber.

Each piston is associated with a high pressure seal and a low pressure seal, which are used to prevent water from the corresponding chamber coming out of a head of the pump in which the chambers are obtained. In piston pumps of the prior art, the seals associated with each piston are associated with at least one spacer, generally two spacers. The at least one spacer that supports the seals is normally assembled in a stationary position completely within the head, while the pistons are movable forwards and backwards to increase or decrease the volume of the corresponding chambers.

The high pressure seal is located near the area of the head in which the variable volume chamber associated with the piston is located. Downstream of the high pressure seal there is a spacer. Finally, downstream of the spacer there is the low pressure seal. As a whole, the high pressure seal, the spacer and the low pressure seal define a pump seal pack.

The highest vibrations and pressures are normally concentrated within the head. In pumps of the prior art, the seal pack is entirely contained in the head unit, which is made of steel or brass (generally brass) or materials that allow high operating pressures to be withstood.

Due to such an arrangement, pumps of the prior art have some drawbacks. In particular, the head must have dimensions such as to completely contain the seal pack and. Since the head is completely made of steel and/or brass, the total weight of the pump and consequently its cost are high.

US 2011/0027106 discloses a pump comprising a first manifold, a second manifold and a crankcase or casing. A plurality of chambers are obtained in the first manifold, the chambers communicating with respective cylinders provided in the second manifold. A piston is slidable inside each cylinder. The second manifold is interposed between the first manifold and the casing. A crankshaft is housed inside the casing for driving the pistons. The first manifold communicates with the second manifold by means of a cylindrical communication tube. The communication tube extends over both the first manifold and the second manifold, so as to constitute a part of the cylinder.

The pump disclosed in US 2011/0027106 further comprises an annular high-pressure seal and an annular low-pressure seal, arranged in contact with the external surface of the piston for preventing the working liquid from leaking from the pumping chamber towards the casing.

Both the high-pressure seal and the low-pressure seal disclosed in US 2011/0027106 are housed inside the second manifold.

The first and the second manifold can be considered as two parts of a head, which houses the hydraulic components of the pump, i.e. the components that are intended to contact the liquid to be processed. On the other hand, the casing houses the driving components which drive the pump.

Both the high-pressure seal and the low-pressure seal disclosed in US 2011/0027106 can thus be considered as housed inside the head, although the latter is made of two parts. Housing both the high-pressure seal and the low-pressure seal inside the head involves the drawbacks that have been previously discussed in connection with other known pumps.

An object of the invention is to improve piston pumps of the known art, particularly of the type suitable for processing a liquid such as water.

A further object is to provide a piston pump that is less heavy and costly with respect to piston pumps of the known art.

According to the invention, there is provided a pump comprising:
  at least one piston slidable within an opening along a movement direction in order to vary the volume of a chamber, the chamber comprising an inlet and an outlet for a liquid,
  a casing within which a driving device is housed for moving the piston along the movement direction;
  a head within which the chamber is at least partially obtained, the head being fixed to the casing so that the piston delimits a portion of the chamber;
  a sealing arrangement provided along the opening and associated with the piston in a radially external position thereto in order to prevent leaks of liquid from the chamber, the sealing arrangement comprising at least one high pressure sealing element or first sealing element located in a proximal position with respect to the chamber and a low pressure sealing element or second sealing element located in a distal position with respect to the chamber to stop any quantities of liquid that the high pressure sealing element has let through;
wherein the high pressure sealing element is housed within the head and the low pressure sealing element is housed within the casing.

The configuration of the sealing arrangement allows a smaller head to be produced with respect to the prior art, hence reducing the weight of the whole pump and its cost.

In particular, the Applicant has found that by leaving the high pressure sealing element within the head and moving the low pressure sealing element into the casing, the aforementioned advantages in terms of weight and cost do not worsen pump performance.

In an embodiment, a spacer is provided, the spacer being arranged between the high pressure sealing element and the low pressure sealing element. In particular, the spacer can be arranged straddling the casing and the head. Furthermore the spacer contains the low pressure sealing element.

The presence of the spacer allows the low pressure sealing element to be contained and the head to be more easily centred, at the same time being a guide for the piston.

In an embodiment, a space is provided, the space being arranged between the high pressure sealing element and the low pressure sealing element to place the suction of the pump and the low pressure sealing element in communication. To limit mechanical processing in particular at internal portions of the head and the casing, one or more of the following aspects may be envisaged. For example, the space is at least partially defined by a housing surface of the casing. In particular, the space is delimited by the spacer, by a housing surface of the casing arranged parallel to the movement direction of the piston and by a coupling surface of the head arranged perpendicular to the movement direction.

In an embodiment, a connection conduit arranged between a suction of the pump and the space is obtained completely within the head.

Owing to the presence of a shoulder arranged within the opening, an abutment surface can be defined for the sealing arrangement.

The invention can be better understood and carried out with reference to the attached drawings, which illustrate a non-limiting embodiment thereof, in which.

With reference to the appended figures, 1 indicates as a whole a pump for processing a liquid, particularly water, intended for example to be used as a cleaning liquid inside cleaning machines such as small high pressure water jet machines.

Pump 1 is of the volumetric piston type.

The pump 1 comprises a casing 2 or crankcase which houses a driving device for moving the pistons of the pump 1. A head 4 is fixed to the casing 2 through fixing elements comprising, for example, a plurality of screws 3. The casing 2 may be made for example of aluminium, whereas the head 4 may be made of brass.

Figure 3:
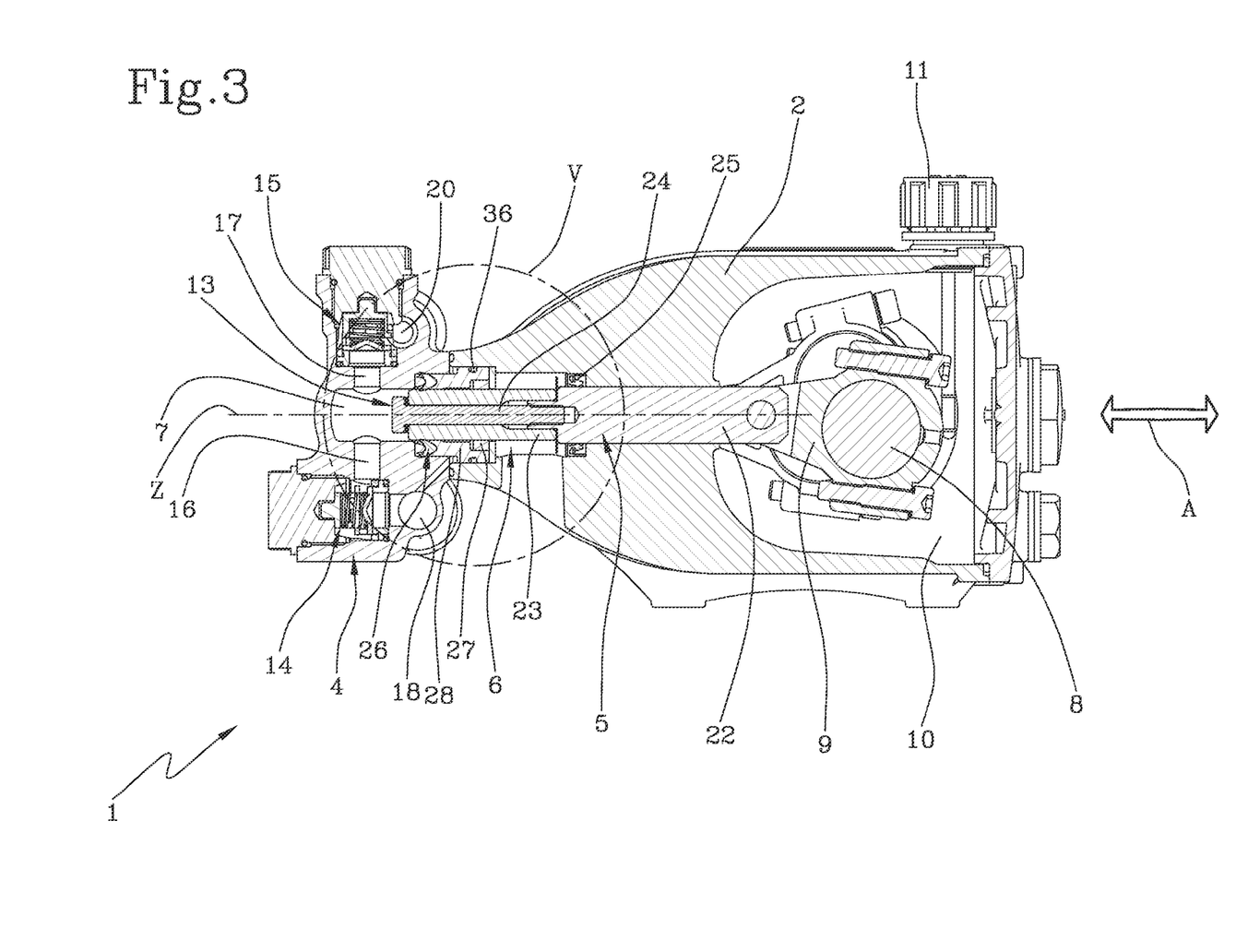
FIG. 3 is a sectional view, taken along the plane of FIG. 1.

The pump 1 comprises a plurality of pistons 5, one of which is visible in FIG. 3. Each piston 5 is slidable within a corresponding opening 6 along a movement direction A so as to vary the volume of a chamber 7, obtained in the head 4 at one end of the piston 5. In particular, the chamber 7 is obtained at least partially in the head 4 so that the relative piston 5 delimits a portion of it in an assembled configuration of the head and of the casing.

Said chamber 7 is also commonly known as a cylinder in the field.

The casing 2 and the head 4 have reciprocal coupling surfaces 2a, 4a that can be arranged perpendicular to the movement direction A.

Figure 4:
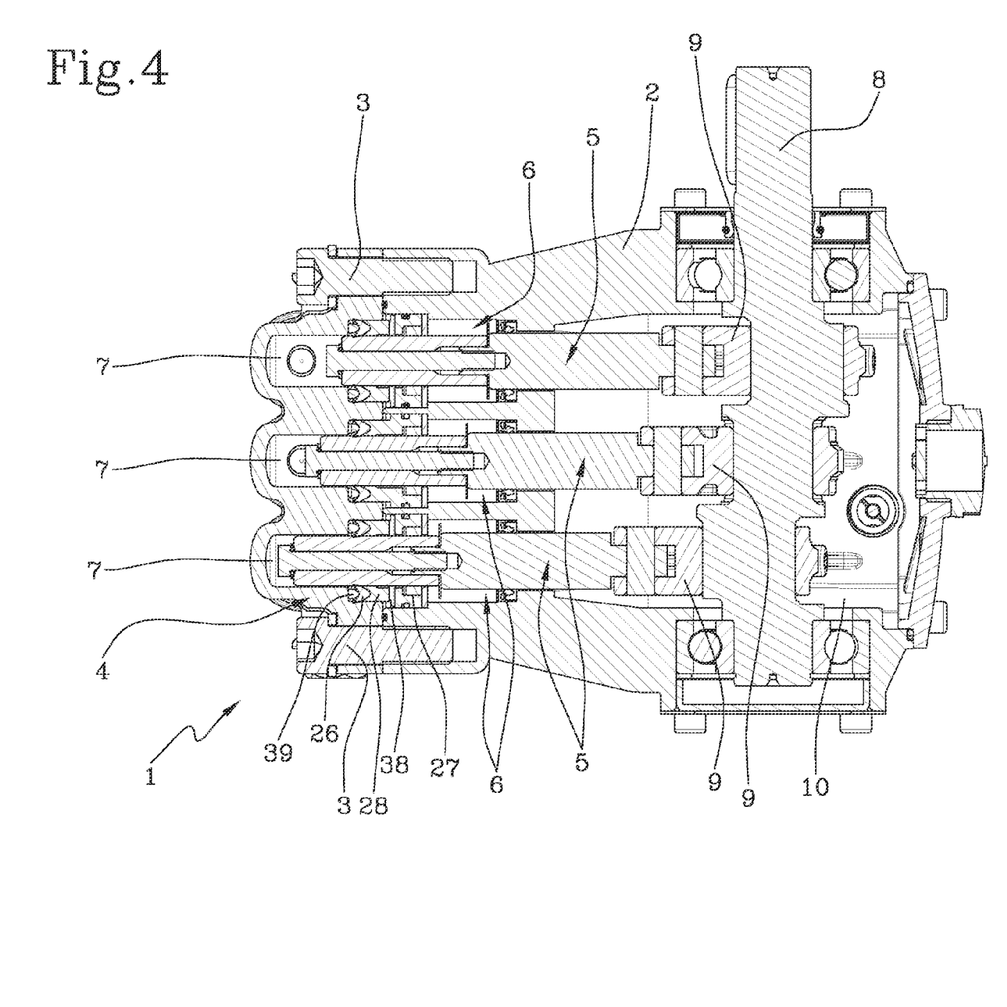
FIG. 4 is a sectional view, taken along the plane VI-VI of FIG. 2.
Figure 5:
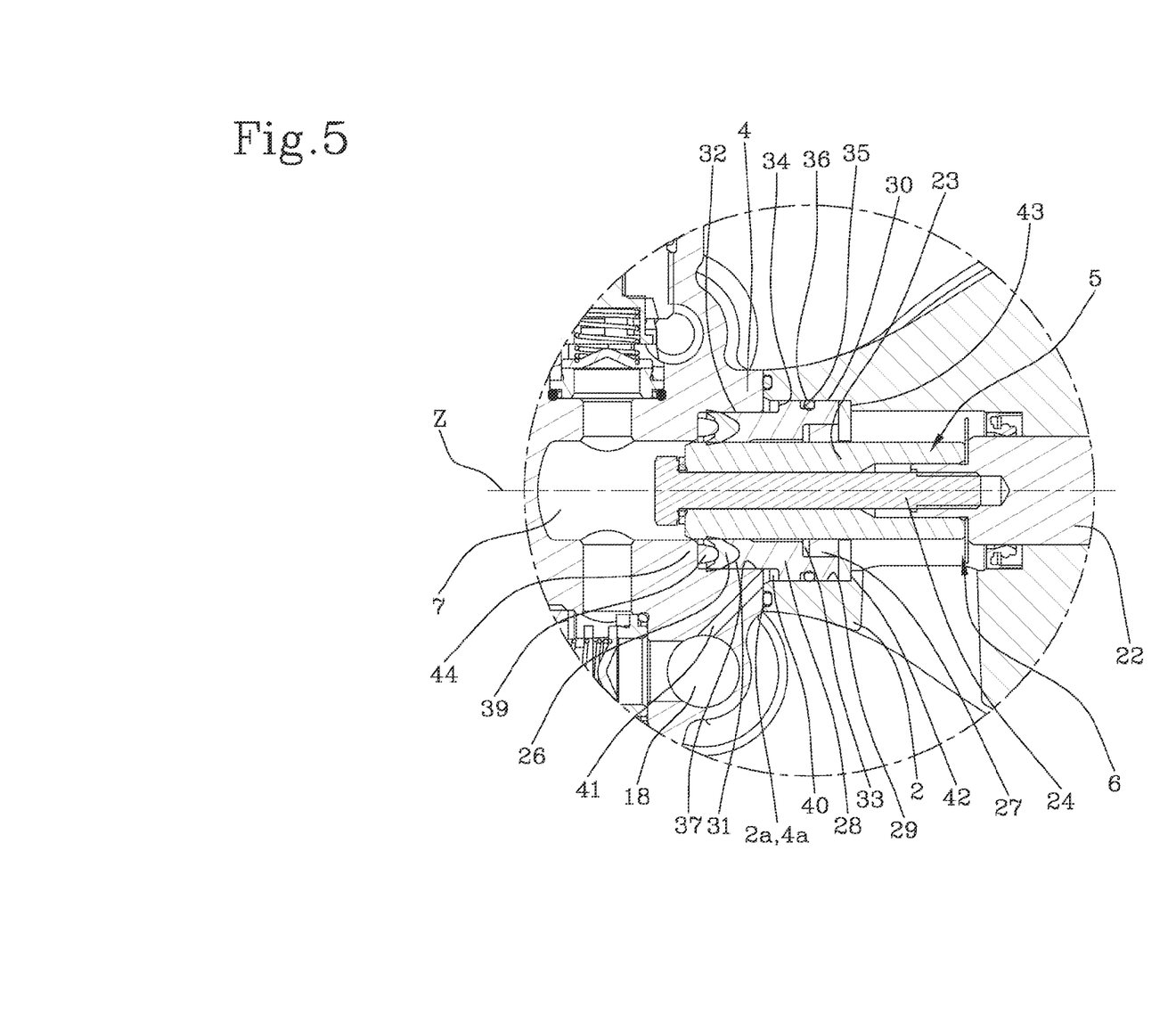
FIG. 5 is an enlarged view of detail V of FIG. 3.

In the example shown, three pistons 5 are provided, as shown in FIG. 4.

It is however also possible to use a number of pistons 5 other than three.

As shown in FIG. 4, the pistons 5 are aligned with each other, i.e. arranged so that their axes lie on a common plane.

In an alternative embodiment, the pistons may be arranged so that their axes do not lie on a common plane, but are staggered between each other.

The driving device comprises an eccentric shaft 8, housed rotatably within the casing 2. In an embodiment not represented in the appended figures the driving device comprises, in place of an eccentric shaft 8, a crank shaft housed rotatably within the casing 2.

Each piston 5 is driven by the eccentric shaft 8 by means of a corresponding connecting rod 9 fixed to the eccentric shaft 8.

The eccentric shaft 8 is arranged within a cavity 10 obtained in the casing 2.

In normal operating conditions, within the cavity 10 there is a quantity of lubricating oil, which can be introduced into the casing 2 for example through an inlet hole that is closable by means of a plug 11.

The casing 2 is provided with a flange 12 that allows the pump 1 to be fixed to a motor not shown, the motor being suitable for rotating the eccentric shaft 8.

When the eccentric shaft 8 rotates, each piston 5 is moved forwards and backwards while sliding along the movement direction A. In this way, the piston 5 causes the volume of the chamber 7 to increase or decrease alternatively.

Each piston 5 has a first end 13 that delimits at least partially the chamber 7 and a second end, opposite the first end 13, hinged to the connecting rod 9.

As shown in FIG. 3, each chamber 7 is associated with a suction valve 14 and a supply valve 15. When the suction valve 14 is open, the supply valve 15 is closed and the liquid to be pumped can enter the chamber 7.

This happens during a suction step which occurs while the piston 5 moves backwards so as to gradually increase the volume of the chamber 7. On the other hand, when the supply valve 15 is open, the suction valve 14 is closed and the liquid is pumped out of the chamber 7. This happens during a compression step which occurs while the piston 5 moves forward thereby gradually reducing the volume of the chamber 7. The suction valve 14 is associated with an inlet 16 of the chamber 7 and the supply valve 15 is associated with an outlet 17 of the chamber 7.

Figure 1:
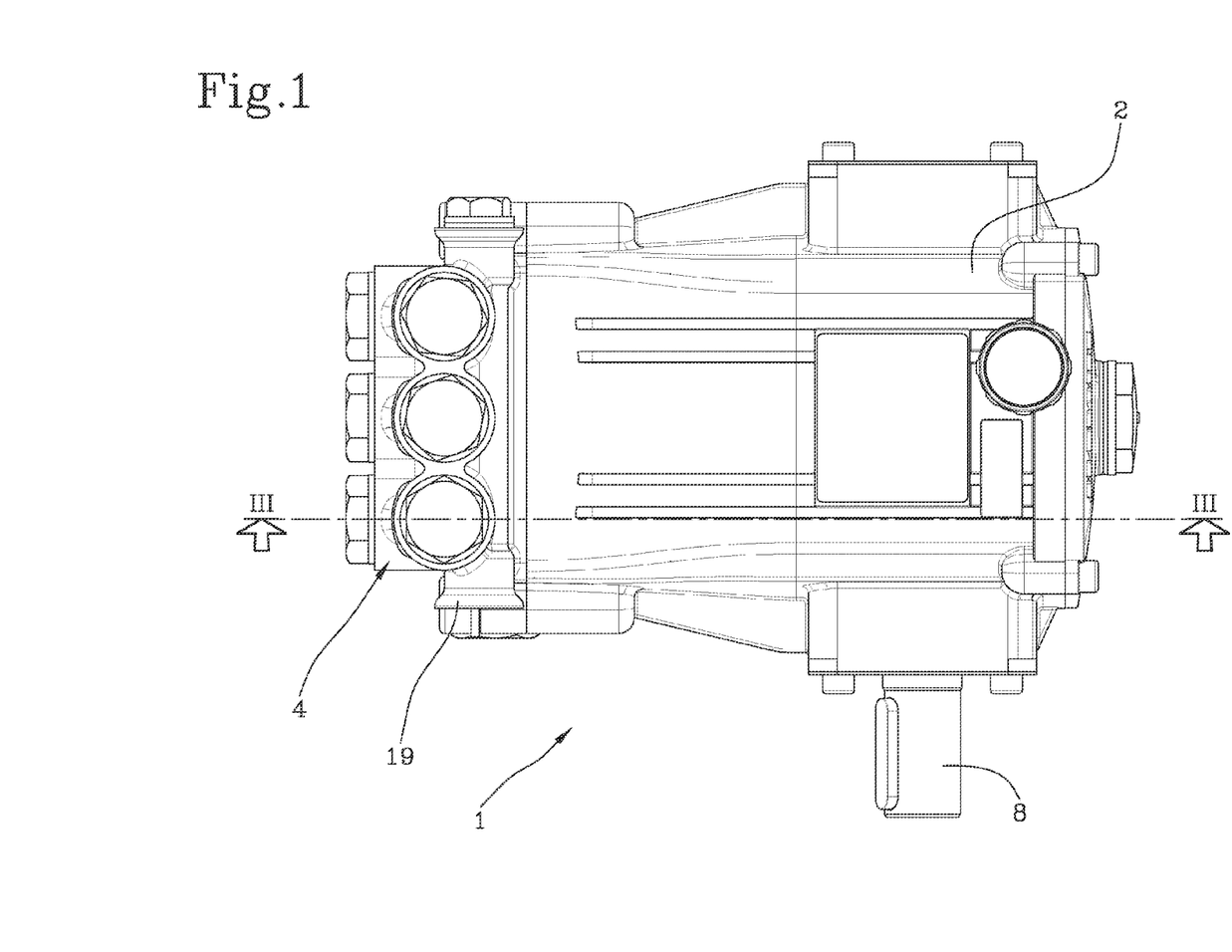
FIG. 1 is a view from above of a pump according to the invention.
Figure 2:
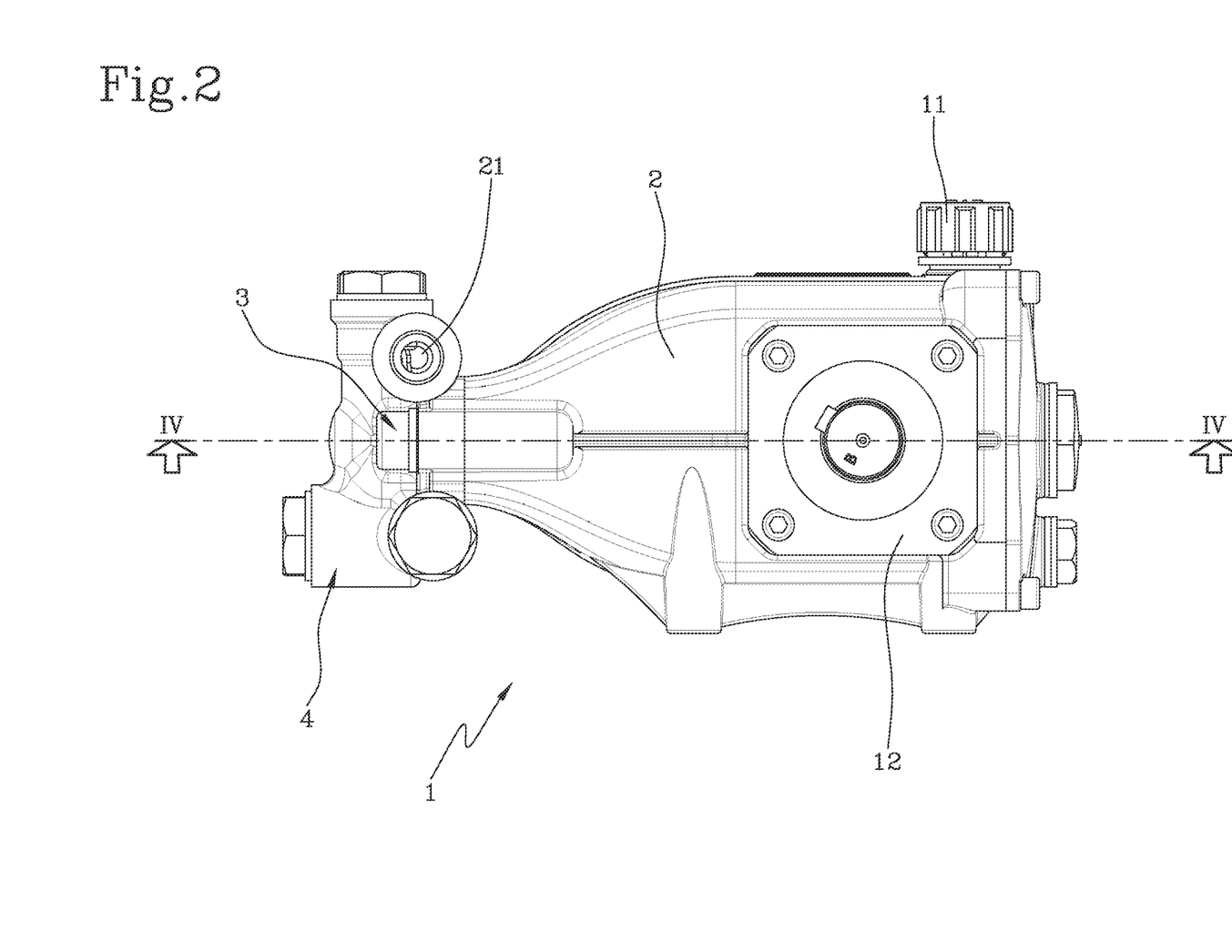
FIG. 2 is a lateral view of the pump of FIG. 1.

The liquid to be pumped reaches the suction valve 14 through an inlet manifold 18 shaped like a hole, particularly rectilinear, obtained within the head 4. If several pistons 5 are present, the inlet manifold 18 allows the liquid to be pumped to be sent to the suction valves 14 associated with each piston 5. The inlet manifold may be connected to a source of liquid not illustrated, through an inlet 19, shown in FIG. 1.

In an embodiment not illustrated, the inlet manifold may be obtained in a different position from that described above, for example in the casing 2.

The pump 1 further comprises an outlet manifold 20 for collecting the liquid coming out of the chambers 7 and sending it towards a point of use, through an outlet 21.

The outlet manifold 20 is in fluid communication with the supply valves 15 associated with all the pistons 5, so as to collect the liquid coming out of all the chambers 7.

Each piston 5 can be produced by assembling various components, and can comprise, for example, a support portion 22, hinged to the connecting rod 9, on which a piston body 23 is assembled. The latter can have a tubular shape and be provided with an axial hole through which a fixing member 24 passes, the fixing member 24 being conformed for example like a screw. The fixing member 24 allows the piston body 23 to be fixed to the support portion 22. The piston body 23 slides in contact with other components during the operation of the pump 1 and is made with a very hard material, for example ceramic or highly resistant steel, so as to minimise wear.

The piston 5 extends along a longitudinal axis Z.

Within the casing 2, a seal 25 is housed. The seal 25 has an annular conformation and is provided with a hole through which the piston 5 passes. The seal 25 has an internal lip in contact with which the piston 5 slides. In this way, the seal 25 prevents any oil leaks from the cavity 10 towards the head 4. The seal 25 therefore behaves like an oil seal.

A sealing arrangement is housed in the head 4, the sealing arrangement being suitable for preventing the liquid contained in the chamber 7 from exiting.

The sealing arrangement is provided along the opening 6 and is associated with the piston 5 in a position radially external to the piston 5, so as to prevent liquid leaks from the chamber 7.

The sealing arrangement comprises at least one high pressure sealing element 26 or first sealing element located in a proximal position with respect to the chamber 7 and a low pressure sealing element 27 or second sealing element located in a distal position with respect to the chamber 7 for stopping any quantities of liquid let which the high pressure sealing element 26 allowed to pass.

The definition high/low pressure sealing element is due to the fact that the first sealing element 26 works with a liquid that has a higher pressure than the pressure of the same liquid with which the second sealing element 27 works. In fact, the first sealing element 26 interacts with the liquid coming directly from the chamber 7, which therefore has a relatively high pressure.

The second sealing element 27, on the other hand, interacts with the same liquid whose pressure is lower.

The high pressure sealing element 26 and the low pressure sealing element 27 both have an annular conformation and have an internal diameter that allows them to engage in contact with the piston body 23. In particular, the high pressure sealing element 26 and the low pressure sealing element 27 are provided with respective internal sealing lips in contact with which the piston body 23 slides.

The high pressure sealing element 26 and the low pressure sealing element 27 can be produced by using seals for example made of rubber or elastomeric material.

In the example shown in the drawings, the high pressure sealing element 26 is housed within the head 4 and the low pressure sealing element 27 is housed within the casing 2. In other words, the high pressure sealing element 26 is housed in a portion of the head 4 arranged between the coupling surface 4a and the chamber 7 while the low pressure sealing element 27 is housed in a portion of the casing arranged on the opposite side of the chamber 7 with respect to the coupling surface 2a.

Reference number 28 indicates a spacer which is included in the sealing arrangement and located between the high pressure sealing element 26 and the low pressure sealing element 27. In particular, the spacer 28 is provided with an internal hole having a diameter which is substantially equal to the external diameter of the piston body 23 for receiving the piston body 23.

The spacer 28 is arranged straddling the casing 2 and the head 4. In other words the coupling surfaces 2a, 4a respectively of the casing 2 and the head 4 are arranged in reciprocal contact at an intermediate portion of the spacer 28.

The spacer 28 can have a tubular conformation defining a first external lateral surface 29 arranged in contact with a housing surface 30 of the casing 2 and a second external lateral surface 31 arranged in contact with a housing surface 32 of the head 4. The housing surface 30 of the casing 2 and the housing surface 32 of the head 4 are arranged parallel to the movement direction A.

In other words the spacer 28 is housed partially in a hole obtained in the head 4 and partially in a hole obtained in the casing 2.

The spacer 28 may contain the low pressure sealing element 27. In particular an annular housing 33 is obtained inside the spacer 28, in a position adjacent to the hole that receives the piston body 23, the annular housing 33 being suitable for receiving the low pressure sealing element 27.

According to a possible embodiment, the first external lateral surface 29 has a diameter larger than the second external lateral surface 31, a connecting wall 34 being thus defined.

On one of the external lateral surfaces of the spacer 28, particularly the first external lateral surface 29, a groove 35 is obtained, the groove 35 being suitable for receiving an annular gasket 36, for example an O-Ring.

The annular gasket 36 is intended to be for example interposed between the casing 2 and the first external lateral surface 29 of the spacer 28, so as to prevent leakage of the liquid coming from the chamber 7.

The spacer 28 comprises an annular recess 37, obtained on a surface arranged transversely with respect to the longitudinal axis Z of the piston 5. The annular recess 37 is conformed so as to shapingly engage with a portion of the high pressure sealing element 26. In other words, the annular recess 37 is arranged for receiving the high pressure sealing element 26.

The spacer 28 comprises a passage arrangement for allowing the passage of liquid from the outside of the spacer towards the inside. The passage arrangement can comprise one or more passages 38 (FIG. 4) that extend into the thickness of the spacer 28.

In the example shown, two passages 38 are provided, arranged in a diametrically opposite position.

The function of the passages 38 will become clear from the description below.

An abutment element 39 is further provided, the abutment element 39 being suitable for abutting against the high pressure sealing element 26 in order to push it against the spacer 28. The abutment element 39 has an annular conformation and is shaped so as to shapingly engage with a portion of the high pressure sealing element 26.

Reference number 40 indicates a space arranged between the high pressure sealing element 26 and the low pressure sealing element 27.

The space 40 is suitable for placing in communication a suction of the pump (inlet manifold 18) with the low pressure sealing element 27, in particular through the passages 38. Controlled quantities of liquid come into the space 40 from a suction of the pump 1. Furthermore, in the space 40 there may be small quantities of liquid coming from the chamber 7, which were not stopped by the high pressure sealing element 26. The liquid in the space 40, passing through the passages 38, reaches the low pressure sealing element 27, keeping it constantly wet. It is therefore avoided that the low pressure sealing element 27 works dry, which would cause rapid wear.

The space 40 can be at least partially defined by the housing surface 30 of the casing 2.

The space 40 can be arranged radially external around the spacer 28, if present.

The space 40 can be delimited by the spacer 28 (for example by the second external lateral surface 31 and the connecting wall 34), by the housing surface 30 of the casing 2 arranged parallel to the movement direction A and by the coupling surface 4a of the head 4 arranged perpendicular to the movement direction A.

Reference number 41 indicates a connection conduit arranged between a suction of the pump (inlet manifold 18) and the space 40. The connection conduit 41 can be obtained completely within the head 4. The connection conduit 41 may lead into the coupling surface 4a of the head 4.

Reference number 42 indicates a shoulder of the casing 2 located within the opening 6 and defining an abutment surface 43 for the sealing arrangement, the abutment surface 43 being arranged perpendicular to the movement direction A. The abutment surface 43 is spaced along the movement direction A with respect to the coupling surface 2a at which the casing 2 is coupled with the head 4.

The spacer 28, the high pressure sealing element 26, the low pressure sealing element 27 and the abutment element 39 form a packed set, or a seal pack, housed partly within the head 4 and partly within the casing 2.

The spacer 28 strikes against the abutment surface 43 of the casing 2.

Such a packed set is clamped between the abutment surface 43 of the casing 2 and a shoulder 44 obtained within the head 4. Within the packed set as above, a hole is defined in which the piston body 23 can slide.

The spacer 28 has the dual function of containing the low pressure sealing element and facilitating the centering of the head, while at the same time being a guide for the piston.

During operation, each piston 5, driven by the eccentric shaft 8 through the corresponding connecting rod 9, slides forwards and backwards along the movement direction A.

The piston body 23 moves within the spacer 28, if present, or in general within the sealing arrangement. The high pressure sealing element 26 is in contact with the piston body 23 and prevents the passage of large quantities of liquid from the chamber 7 towards the casing 2. The low pressure sealing element 27, also arranged in contact with the piston body 23, prevents the blow-by towards the casing 2 of any quantities of liquid that manage to pass through the high pressure sealing element 26.

The invention claimed is:

1. A pump comprising:
    at least one piston slidable within an opening along a movement direction in order to vary the volume of a chamber, said chamber comprising an inlet and an outlet for a liquid;
    a casing within which a driving device is housed for moving said at least one piston along said movement direction;
    a head within which said chamber is at least partially obtained, said head being fixed to the casing in such a way that said at least one piston delimits a portion of said chamber; and
    a sealing arrangement arranged along said opening and associated with said at least one piston in a radially external position thereto in order to prevent leaks of liquid from the chamber, said sealing arrangement comprising at least one high pressure sealing element located in a proximal position with respect to the chamber and a low pressure sealing element located in a distal position with respect to the chamber to stop any quantities of liquid that the high pressure sealing element has allowed to pass;
    wherein said high pressure sealing element is housed inside the head and said low pressure sealing element is housed inside the casing, the pump further comprising a space arranged between said high pressure sealing element and said low pressure sealing element, said space being suitable for placing in communication a suction of the pump and said low pressure sealing element, wherein said space is entirely obtained within the casing and closed by the head.

2. A pump according to claim 1, wherein said casing comprises a shoulder arranged within said opening and defining an abutment surface for said sealing arrangement, said abutment surface being arranged perpendicular to said movement direction, said abutment surface being at a distance from a coupling surface of the casing with said head.

3. A pump according to claim 1, comprising a connection conduit arranged between the suction of the pump and said space, said connection conduit being obtained completely in said head.

4. A pump according to claim 3, wherein said casing and said head have reciprocal coupling surfaces, and wherein said connection conduit leads into the coupling surface of the head.

5. A pump according to claim 1, wherein said sealing arrangement comprises a spacer arranged between said high pressure sealing element and said low pressure sealing element, said spacer being arranged straddling the casing and the head, and wherein said space is arranged radially external around said spacer.

6. A pump according to claim 5, wherein said space is delimited by said spacer, by a housing surface of the casing arranged parallel to said movement direction and by a coupling surface of the head arranged perpendicular to said movement direction.

7. A pump according to claim 1, wherein said sealing arrangement comprises a spacer arranged between said high pressure sealing element and said low pressure sealing element, said spacer being arranged straddling the casing and the head.

8. A pump according to claim 7, wherein said spacer contains said low pressure sealing element.

9. A pump according to claim 7, wherein said spacer comprises a first external lateral surface arranged in contact with a housing surface of the casing and a second external lateral surface arranged in contact with a housing surface of the head, wherein the first external lateral surface has a diameter larger than the second external lateral surface, a connecting wall being defined between the first external lateral surface and the second external lateral surface.

10. A pump according to claim 9, wherein said spacer comprises an annular gasket interposed between the casing and the first external lateral surface of the spacer.

11. A pump comprising:
    at least one piston slidable within an opening along a movement direction in order to vary the volume of a chamber, said chamber comprising an inlet and an outlet for a liquid;
    a casing within which a driving device is housed for moving said at least one piston along said movement direction;
    a head within which said chamber is at least partially obtained, said head being fixed to the casing in such a way that said at least one piston delimits a portion of said chamber; and
    a sealing arrangement arranged along said opening and associated with said at least one piston in a radially external position thereto in order to prevent leaks of liquid from the chamber, said sealing arrangement comprising at least one high pressure sealing element located in a proximal position with respect to the chamber and a low pressure sealing element located in a distal position with respect to the chamber to stop any quantities of liquid that the high pressure sealing element has allowed to pass;
    wherein said high pressure sealing element is housed inside the head and said low pressure sealing element is housed inside the casing, the pump further comprising a space arranged between said high pressure sealing element and said low pressure sealing element, said space being suitable for placing in communication a suction of the pump and said low pressure sealing element, said space being at least partially obtained inside the casing, wherein said sealing arrangement comprises a spacer arranged between said high pressure sealing element and said low pressure sealing element, said spacer being arranged straddling the casing and the head, and wherein said space is arranged radially external around said spacer, said space being delimited by said spacer, by a housing surface of the casing arranged parallel to said movement direction and by a coupling surface of the head arranged perpendicular to said movement direction.

* * * * *